May 30, 1933.  W. KLOSS ET AL  1,912,000

METHOD OF FORMING HEAD LAMP HOUSINGS

Filed Dec. 2, 1929    4 Sheets-Sheet 1

INVENTORS.
Walter Kloss and Joseph J. Hoffer
BY
ATTORNEY

May 30, 1933.   W. KLOSS ET AL   1,912,000
METHOD OF FORMING HEAD LAMP HOUSINGS
Filed Dec. 2, 1929   4 Sheets-Sheet 2

INVENTORS
Walter Kloss Joseph Hoffer
BY
C. M. Pomeroy
ATTORNEY

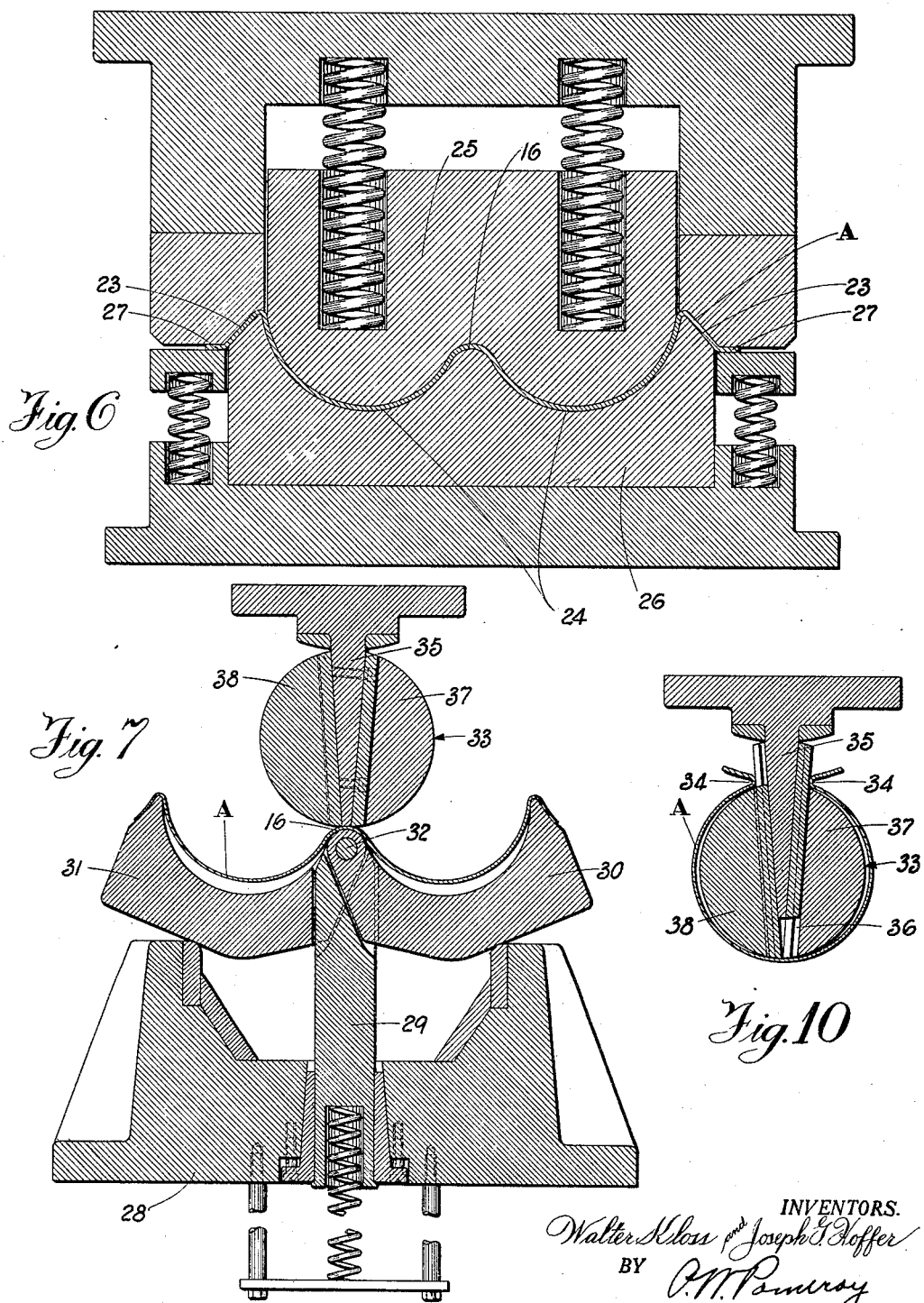

May 30, 1933.  W. KLOSS ET AL  1,912,000
METHOD OF FORMING HEAD LAMP HOUSINGS
Filed Dec. 2, 1929  4 Sheets-Sheet 4

INVENTORS.
Walter Kloss and Joseph J. Hoffer
BY
C. N. Pomeroy
ATTORNEY

Patented May 30, 1933

1,912,000

UNITED STATES PATENT OFFICE

WALTER KLOSS AND JOSEPH G. HOFFER, OF SOUTH BEND, INDIANA, ASSIGNORS TO THE PIERCE-ARROW MOTOR CAR COMPANY, OF BUFFALO, NEW YORK, A CORPORATION OF NEW YORK

METHOD OF FORMING HEAD LAMP HOUSINGS

Application filed December 2, 1929. Serial No. 411,076.

Our invention relates to an improved method of manufacturing headlamp housings for vehicles, and particularly headlamp housings adapted to be mounted on and attached to the fenders of automobiles. Heretofore headlamp housings of this general design have been stamped out of two separate pieces of metal joined together so that the seam was necessarily formed running longitudinally of the headlamp housings midway between the free edges thereof. It is proposed, with our invention herein set forth, to materially simplify the method of manufacturing headlamp housings and substantially reduce the cost of their manufacture.

Not only does our improved process result in a reduction in the cost of manufacturing headlamp housings but it permits the manufacture thereof with less material than has been necessary with the methods heretofore employed. Furthermore, it insures the production of headlamp housings which do not have seams or high and low spots therein and which eliminate waste due to welding, grinding and to that not uncommon occurrence of producing more parts for one side of the housing than for the other side thereof. It eliminates also the trimming of two separate stampings which must of necessity afterward be joined together.

Heretofore it has been found very difficult to match the parts of the headlamp housing so that the same could be properly finished and which would not show a seam where the two parts were joined, whereas with our improved process of manufacture there is no seam, nor is the metal distorted at any point causing high and low spots in the completed assembly.

In addition to the advantageous results heretofore set forth, other advantages will be apparent from the detailed description to follow, and then claimed, having the above and other objects in view.

In the accompanying drawings which show a suitable embodiment of the present invention, Figure 1 is a perspective of a sheet metal blank suitable for use in the forming of a headlamp housing according to our improved process.

Figure 6 is a similar cross sectional view taken on the same line as Figure 4 after completion of the third forming operation.

Figure 7 is a cross sectional view of a die including the collapsible ram in expanded position, the hinged die members in open position, and the material as processed in the third forming die.

Figure 10 is a cross sectional view of the collapsible ram in contracted position permitting the removal of the complete headlamp housing therefrom.

Referring to the accompanying drawings in which like numerals refer to like parts throughout the several views, we provide a sheet metal blank A of suitable shape and size to be used in the forming of the headlamp housing for use on automobiles and the like.

Figure 4:
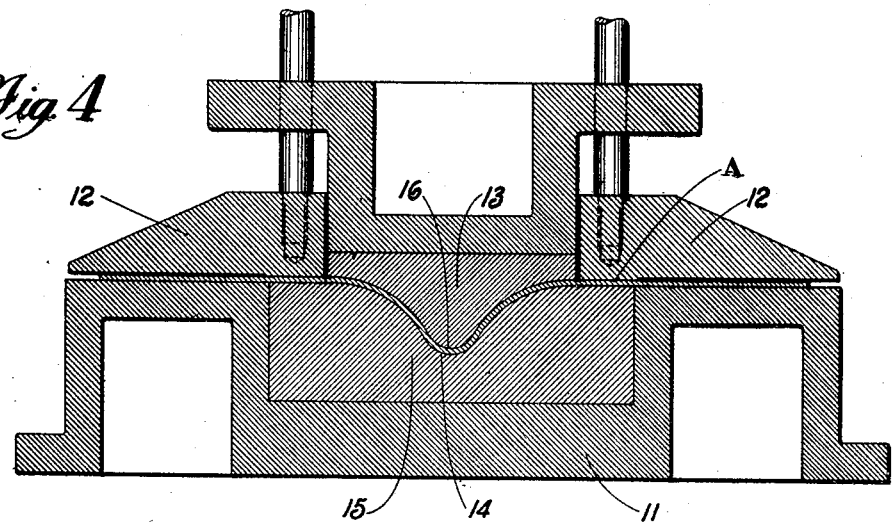
Figure 4 is a cross sectional view through the forming die for the first operation showing the blank in its first formed position therein.

There is shown in cross section, in Figure 4, the cooperating parts of the first forming die which shape the blank A to form a depression therein substantially midway between the free edges thereof to thus provide a means whereby the blank may be properly positioned in other dies during subsequent forming operations. The blank A is clamped adjacent to its free edges between the base 11 of the die and the movable member 12, as shown in Figure 4, to permit the punch 13 to draw the metal of the blank A downwardly into the recess 14 formed in the die 15 to thus complete the first forming operation and form the recess 16 in the blank A to provide a centering means for the blank during subsequent forming operations.

Figure 5:
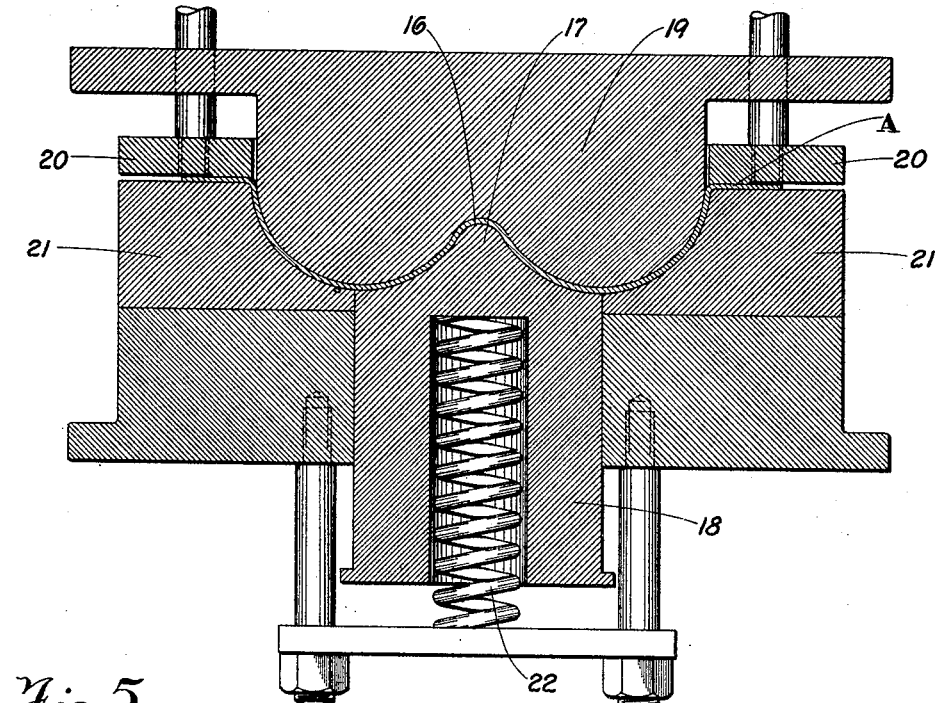
Figure 5 is a similar cross sectional view taken on the same line as Figure 4 after completion of the second forming operation.

After the first forming operation, the metal blank A is then removed from the first forming die, inverted, and then placed in a second forming die as shown in Figure 5. When placed in the second forming die the depression 16 formed in the blank A rests on the projecting part 17 of the ejecting plunger 18. The punch or forming member 19 which also carries the clamping members 20 is moved downwardly toward the base 21, the clamping members 20 moving in advance of the punch 19 to thus clamp the free edges of the material A prior to the second forming operation thereon. The punch 19 moves the ejecting plunger 18 downwardly against the compression of the spring 22 and stretches the material A to take the form shown in Figure 5 as the result of the second forming operation.

Figure 1:
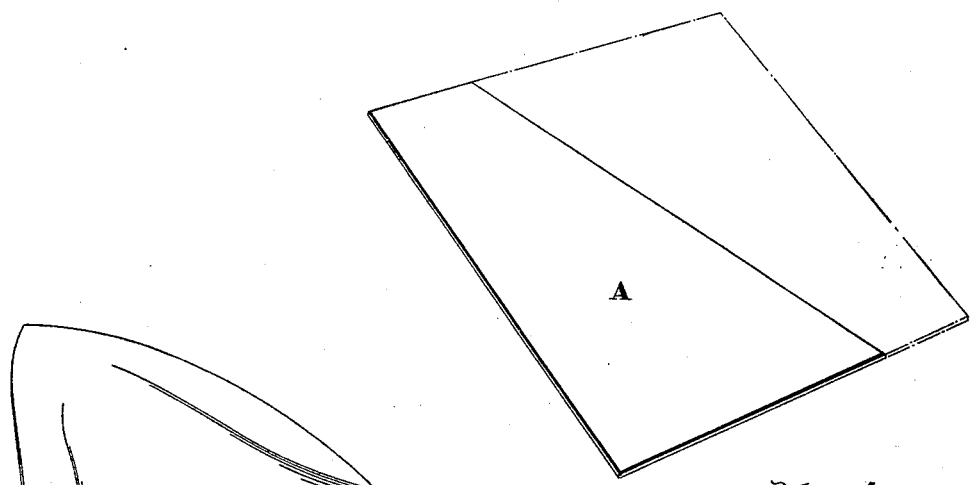
Figure 2:
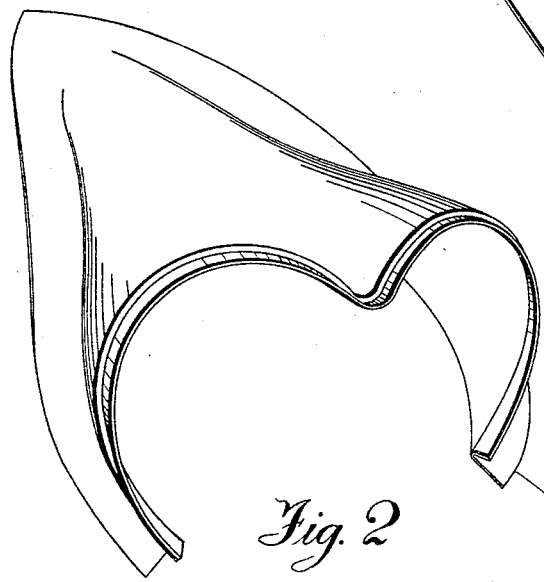
Figure 2 is a perspective of the blank after completion of the third stamping operation.

The material A is then placed in the third forming die, as shown in Figure 6, and the edges 23 of the material adjacent to the curved or cupped shaped portions 24 thereof are formed into the position shown by means of the forming punch 25 which co-operates with the base or forming die 26 to form the edge portions in the manner just described. After the material is removed from the third forming die, the surplus metal 27 is trimmed off to thus provide a stamping formed in the manner illustrated in Figure 2.

Figure 8:
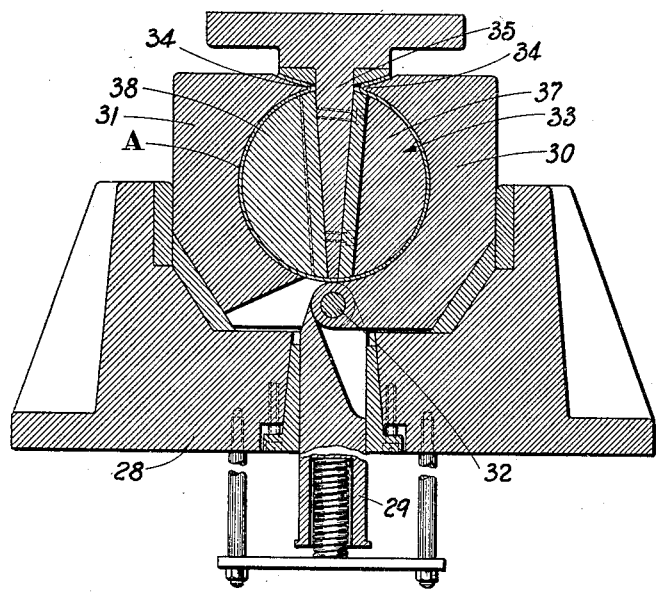
Figure 8 is a similar cross sectional view taken on the same line as Figure 7 showing the headlamp housing in folded position.
Figure 9:
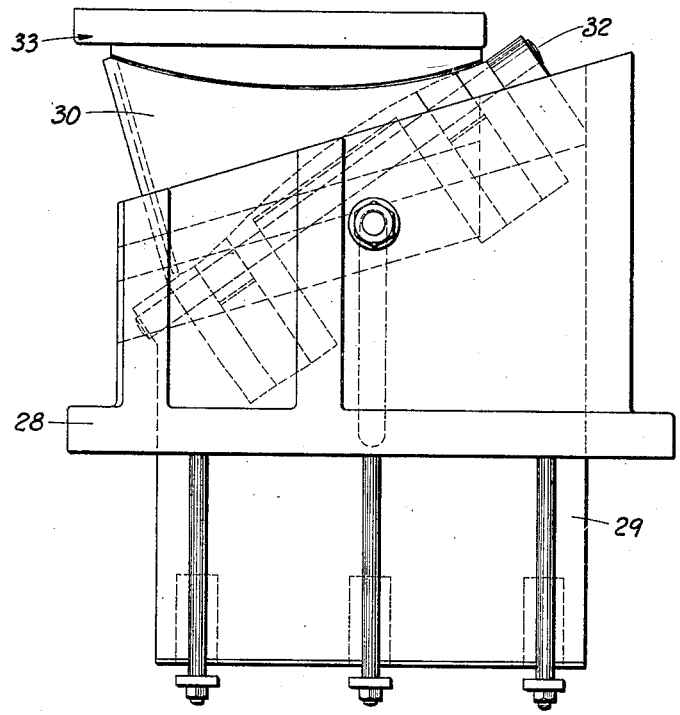
Figure 9 is a side elevation of the folding die shown in Figure 8.

After the material A has been shaped by the three forming operations above described, it is then preferably placed in a folding die, illustrated in Figure 7, which comprises a base 28 having a plunger 29 slidably mounted therein on which is pivotally mounted at 32 a pair of folding dies 30 and 31. The material A is placed on the folding dies 30 and 31 with the recess 16 therein resting directly above the plunger 29 after which the collapsible forming ram, illustrated generally by the numeral 33, is moved downwardly by any suitable source of power against the central depressed portion 16 in the material in line with the plunger 29 to cause the folding dies 30 and 31 to move on their pivot 32 to fold the material around the ram 33 as is clearly shown in Figure 8. When so folded the completed article assumes the shape shown in Figure 3.

After the material is folded to form the completed headlamp housing, it becomes necessary to withdraw the collapsible ram 33 therefrom. To remove the housing from the collapsible ram 33, the folding dies 30 and 31 are first caused to pivot at 32 and swing away from the housing after which the inwardly projecting edges 34 of the housing are spread apart sufficiently to permit the wedge shaped sliding member 35 to slide in the ways 36 formed in the members 37 and 38 to permit clearance between the ram and the housing whereby the housing can be slid off of the ram in its completed condition.

Figure 3:
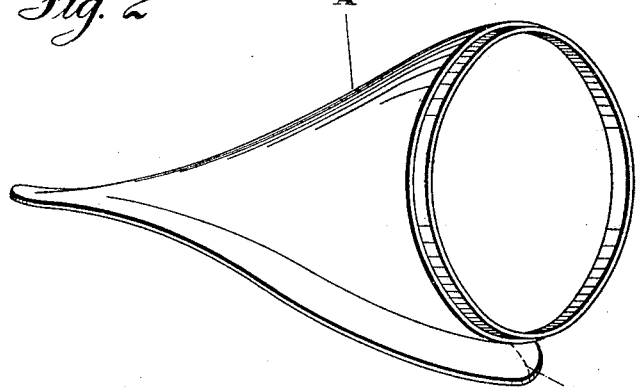
Figure 3 is a perspective of the completed headlamp housing.

After the housing has been so formed the free edges 34 thereof are preferably brought together into a line contact and are welded together in that position. After the housing has been welded along the dotted line 39 as shown in Figure 3, the same is then in condition to be welded or otherwise secured to the fender or other part of the vehicle forming the support therefor to provide the completed assembly.

Having thus described our invention, the method of operation will be clearly apparent to those skilled in the art and it is our desire to claim this method of manufacture broadly, as well as specifically, as is indicated in the appended claims.

What we claim is:

1. The method of shaping sheet metal into a head lamp housing, which consists in, forming a longitudinal depression in the blank, forming conical depressions on either side of said longitudinal depression, and bending the edges of the blank sharply down along the edges of said conical depressions, hooking said bent down edges over the edges of a folding die and folding the wings of the folding die about a core to form a conical housing—at the same time shaping said bent over edges to form a mounting surface conforming in shape to the top surface of an automobile fender upon which the housing is adapted to be mounted.

2. The method of shaping sheet metal into a conical head lamp housing, which consists in, forming two partly conical depressions in the blank and bending the edges of the blank sharply down along the outer edges of said depressions, hooking the bent down edges over the edges of a folding die and forcing a conical core having an auxiliary shaping member into said folding die whereby the blank is folded with a definitely located seam and the edges are formed as a mounting surface for said housing.

3. The method of shaping sheet metal into a conical head lamp housing, which consists in, first forming a longitudinal depression in the blank to serve as a centering means for the blank during subsequent operations, forming conical depressions in the blank on either side of said longitudinal depression, and forming said blank in a folding die using said longitudinal depression as a centering means whereby the seam of the completed housing will be definitely located.

4. The method of forming sheet metal into a conical lamp housing, which consists in, forming a pair of symmetrical, partly conical depressions in a sheet metal blank, and a flange along the outer edge of each depression, bending said blank transversely to cause said flanges to assume the contour of a fender upon which the lamp is to be mounted, and then bending said blank in a folding die to bring the outer edges of said partly conical depressions together.

5. The method of forming a conical lamp body from a flat sheet metal blank which comprises, first forming a depression in the blank and then working the blank progressively through further die forming steps until the blank is finally folded in conical form to form the completed lamp body, using the first formed depression as a centering means for locating the blank in the respective die in each of said steps.

6. The method of forming a conical lamp body from a flat sheet metal blank which comprises, first forming a depression in the blank and then working the blank progressively through further die forming steps until the blank is finally folded in conical form to form the completed lamp body, using the first formed depression as a centering means for locating the blank in the respective die in each of said steps, and clamping the edges of said blank in each die before and during the forming operation in order to draw the metal of the blank into the desired form without wrinkling or distorting the same.

7. The method of forming a conical lamp body from a flat sheet metal blank which comprises, first forming an elongated tapered depression in the blank and then working the blank progressively through further die forming steps until the blank is finally folded in conical form to form the completed lamp body, using the first formed depression as a centering means for locating the blank in the respective die in each of said steps, and to provide space for a high area in the die to prevent the conical blank from slipping out of the die during the forming operation.

8. The method of forming a conical lamp body from a flat sheet metal blank which comprises, clamping the edges of the blank in a die, drawing the metal of the intermediate portion of the blank into a centrally located longitudinally extending depression, turning the partly formed blank upside down on a second die with the die-formed depression overlying a raised portion on the second die to afford a centering means for the blank and prevent the blank from slipping out of the die, clamping the edges of the blank in the second die and drawing the metal on each side of the centering depression into conical depression, bending down and clamping the edges of the partly formed blank in a third die using the first formed depression as a centering and retaining means and drawing the metal of the intermediate portion of the blank to bend the blank transversely to the above mentioned depressions, hooking the bent-over edges of the blank over the side edges of a folding die, and then bending the blank about a mandril to form the finished lamp body.

Signed by us at South Bend, Indiana this 29th day of November 1929.

WALTER KLOSS.
JOSEPH G. HOFFER.